(12) United States Patent
Whitbread et al.

(10) Patent No.: US 6,956,652 B2
(45) Date of Patent: Oct. 18, 2005

(54) OPTICAL AUTOCORRELATOR

(75) Inventors: Neil David Whitbread, Northampton (GB); Andrew Cannon Carter, Blisworth (GB)

(73) Assignee: Bookham Technology, plc, Abingdon (GB)

( * ) Notice: Subject to any disclaimer, the term of this patent is extended or adjusted under 35 U.S.C. 154(b) by 236 days.

(21) Appl. No.: 10/399,085

(22) PCT Filed: Oct. 12, 2001

(86) PCT No.: PCT/GB01/04558
§ 371 (c)(1),
(2), (4) Date: Apr. 11, 2003

(87) PCT Pub. No.: WO02/31356
PCT Pub. Date: Apr. 18, 2002

(65) Prior Publication Data
US 2004/0011947 A1 Jan. 22, 2004

(30) Foreign Application Priority Data
Oct. 12, 2000 (GB) ............................. 0025017

(51) Int. Cl.$^7$ ................................. G01B 9/02
(52) U.S. Cl. ..................................... 356/450
(58) Field of Search ......................... 356/450

(56) References Cited
U.S. PATENT DOCUMENTS 4,369,363 A * 1/1983 Quint et al. ............ 250/214.1
4,628,473 A 12/1986 Weaver
6,614,231 B2 * 9/2003 Thrap ...................... 324/416
6,819,428 B2 * 11/2004 Ogawa ..................... 356/450

FOREIGN PATENT DOCUMENTS

EP        0 971 500 A       1/2000

OTHER PUBLICATIONS

F.R. Laughton et al., "Two Photon Absorption Semiconductor Waveguide Autocorrelator", IEEE Journalof Quantum Electronics, IEEE Inc. New York, vol. 30, No. 3 Mar. 1, 1994, pages 838,845 ISSN: 0018–09197.

* cited by examiner

Primary Examiner—Gregory J. Toatley, Jr.
Assistant Examiner—Patrick Connolly
(74) Attorney, Agent, or Firm—Lahive & Cockfield, LLP; Anthony A. Laurentano, Esq.

(57) ABSTRACT

An optical autocorrelator comprises an optical waveguide (40) of semiconductor material which exhibits two photon absorption at a wavelength at which the autocorrelator is intended to operate. Reflecting means (46) are provided at a part of the waveguide which is remote to an end (42) in which an optical pulse (44) is input for reflecting the optical pulse such as to generate counter-propagating optical pulses in the waveguide. A plurality of electrodes ($48_1$–$48_N$) are disposed along the waveguide for measuring a two photon absorption photocurrent ($i_1$–$i_n$) generated in the waveguide by the counter-propagating optical pulses.

9 Claims, 6 Drawing Sheets

OPTICAL AUTOCORRELATOR

RELATED APPLICATIONS

This application is a 35 U.S.C. 371 national stage filing of International Application No. PCT/GB01/04558, filed 12 Oct. 2001, which claims priority to Great Britain Patent Application No. 0025017.5, filed on 12 Oct. 2000 in Great Britain. The contents of the aforementioned applications are hereby incorporated by reference.

BACKGROUND OF THE INVENTION

This invention relates to an optical autocorrelator and more especially to such a device based on two-photon absorption.

Optical autocorrelators are used for monitoring the width and shape of very short duration optical pulses, i.e. pulse-widths down to a few femtoseconds. Optical autocorrelators are potentially very useful in high data rate optical communication systems (those operating at $\geq 40$ Gbit/sec) where they could be used for monitoring pulse quality and timing jitter in data bit interleaved systems.

Referring to FIG. 1 there is shown a schematic representation of a known optical autocorrelator arrangement which comprises an optical splitter 2, a reference path 4, a variable path delay 6, a non-linear mixing medium 8 and an optical detector 10. An input optical pulse 12 is split by the optical splitter 2 into two signals, sometimes termed channels, 14a, 16a which respectively pass along the reference path 4 and variable path delay 6. Typically the reference path 4 comprises a fixed retro-reflector 18 whilst the variable path delay 6 comprises a moveable retro-reflector 20 which is mounted on a mechanically oscillating stage, such as a loudspeaker. Movement of the retro-reflector 20 is indicated by a double headed arrow 21. The two optical signals 14a 16a are reflected by their respective reflectors 18, 20 and the reflected signals 14b, 16b are mixed together in the non-linear mixing medium 8 to produce a non-linear mixing product which is detected by the optical detector 10. The detected signal is plotted as a function of relative path delay between the two channels and represents an autocorrelation trace of the input optical pulse 12 which can be related to the input pulse-width and shape.

Typically the non-linear mixing element 8 exploits second-harmonic generation (SHG), but other non-linear mixing elements have been proposed which use processes such as two-photon fluorescence (TPF) and two-photon absorption (TPA).

TPA is a non-resonant, non-linear optical process that is observed for photons with energy less than the semiconductor band-gap $E_g$, but greater than $E_g/2$. The process occurs when an electron is excited from the valence to the conduction band via an intermediate virtual state and thus requires two photons. This intermediate state can be any state in any band, although the transition probability is highest when the energy difference between the states involved is smallest; that is, when the intermediate state lies closest to the upper valence band or lower conduction band. One example of a combined mixing and detector element is an AlGaAs/GaAs optical waveguide having a pair of electrodes on the waveguide to measure the photocurrent generated in the waveguide by the two optical signals.

A disadvantage of this type of optical autocorrelator is the difficulty of integrating the moveable reflector, optical splitter and non-linear mixing element.

Optical autocorrelators have also been proposed which rely upon surface-emitting second-harmonic generators (SESHG). An SESHG autocorrelator comprises a waveguide into which identical optical signals are input into opposite ends of the waveguide such as to generate counter-propagating signals. As a result of the counter-propagating waves these generate, via the second-order optical non-linearity of the waveguide material, a second-harmonic (SH) signal that is emitted from the surface of the waveguide in a direction normal to its axis. The spatial distribution of the surface-emitted SH signal along the waveguide constitutes an autocorrelation trace and this is typically imaged onto a charged-coupled device (CCD) camera using bulk optics. It has been further proposed to monolithically integrate an array of photodiodes along the length of the waveguide. To eliminate the need to generate the identical input signals it has been proposed to input a single optical signal into one end of the waveguide and rely on reflection from the opposite end facet to generate the counter-propagating optical signal.

It has also been demonstrated to couple identical signals into opposite ends of the p-i-n waveguide such that they counter-propagate. Such an arrangement eliminates the need for a variable path delay thereby making it possible to fabricate the autocorrelator as an integrated device.

SUMMARY OF THE INVENTION

The present invention has arisen in an endeavour to provide an optical autocorrelator which in part at least alleviates the limitations of the known arrangements.

According to the invention an optical autocorrelator comprises: an optical waveguide of semiconductor material which exhibits two photon absorption at a wavelength at which the autocorrelator is intended to operate; reflecting means associated with a part of the waveguide which is remote to an end in which an optical pulse is input, said reflecting means for reflecting the optical pulse such as to generate counter-propagating optical pulses in the waveguide and a plurality of electrodes disposed along the waveguide for measuring a two photon absorption photocurrent generated in the waveguide by the counter-propagating optical pulses.

Preferably the reflecting means comprises an end facet of the waveguide which can be formed by cleaving or etching of the waveguide. Alternatively the reflecting means comprises a grating structure defined in the waveguide such as a Bragg grating.

To assist in coupling the input optical pulse into the waveguide the autocorrelator preferably further comprises an anti-reflection coating on the end of the waveguide into which the optical pulse is input.

Preferably the electrodes are located at equal intervals along the waveguide such that the photocurrents represent substantially equal time samples. For ease of fabrication the electrodes advantageously form a Schottky contact with the waveguide.

In a particularly preferred implementation the waveguide comprises GaAlAs/GaAs structure though other III–V semiconductor material structures can be utilised.

Advantageously the optical autocorrelator further comprises an optical modulator which is monolithically integrated with the autocorrelator for selectively modulating the intensity of the optical pulse before it is input into the waveguide. Such an arrangement is particularly advantageous for calibrating the autocorrelator.

BRIEF DESCRIPTION OF THE DRAWINGS

In order that the invention can be better understood an optical autocorrelator in accordance with the invention will now be described by way of reference to the accompanying drawings in which.

DESCRIPTION OF ILLUSTRATED EMBODIMENT

Figure 1:
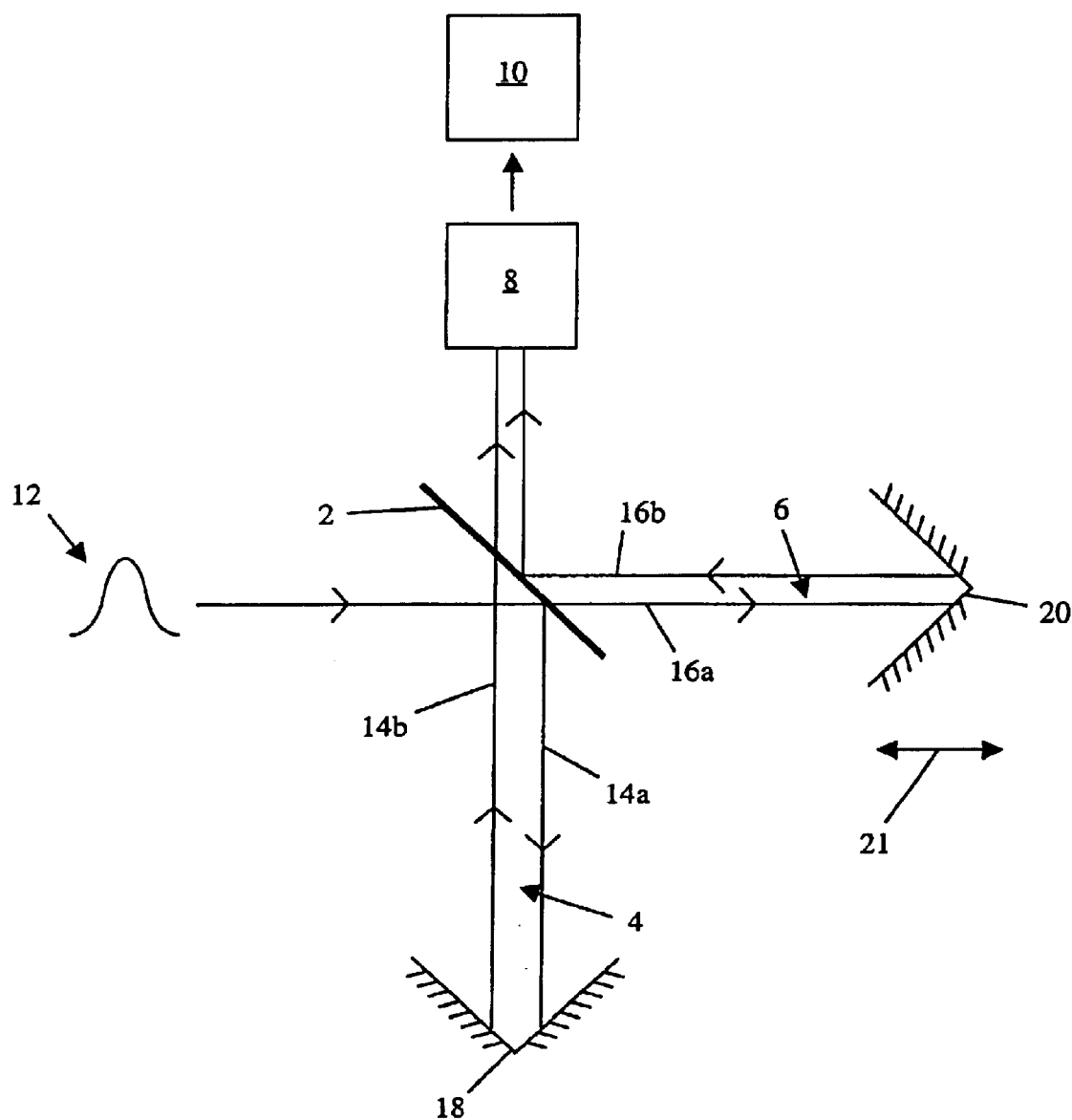
FIG. 1 is a schematic representation of a known optical autocorrelator.
Figure 2:
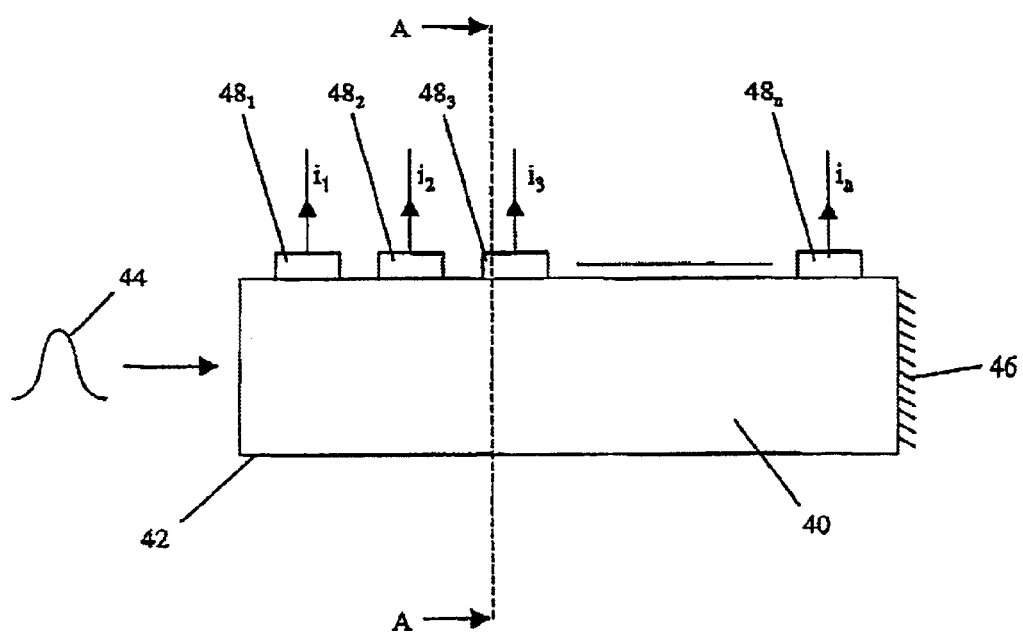
FIG. 2 is a schematic representation of an optical autocorrelator in accordance with the invention.

Referring to FIG. 2 there is shown an optical autocorrelator in accordance with the invention which is for measuring the pulse widths of an optical pulse (data) train 44 with a pulse repetition rate of 40 Gbits$^{-1}$ and a wavelength of 1550 nm (communications band). The autocorrelator comprises an AlGaAs/GaAs optical waveguide 40 having a first optical input end 42 which is anti-reflection coated to maximise coupling of the optical pulse train 44 into the waveguide and an opposite end having a high reflection coating 46 on its end facet. Located on a top surface of and disposed along the length of the optical axis of the waveguide 40 is a plurality (n) of electrodes $48_1$–$48_n$ which are used to detect a respective photocurrent $i_1$–$i_n$ generated through two photon absorption in the region of the waveguide underlying the electrode. In the embodiment illustrated the electrodes are equally spaced at a 75 μm interval along the waveguide such that the photocurrents $i_1$–$i_n$ represent samples which are substantially equally spaced in time, though it will be appreciated that the electrodes can be spaced in other ways. Each electrode $48_1$–$48_N$ forms a Schottky contact with the waveguide. It will further be appreciated that the bandgap of the waveguide material is chosen such that linear absorption is minimal.

Figure 3:
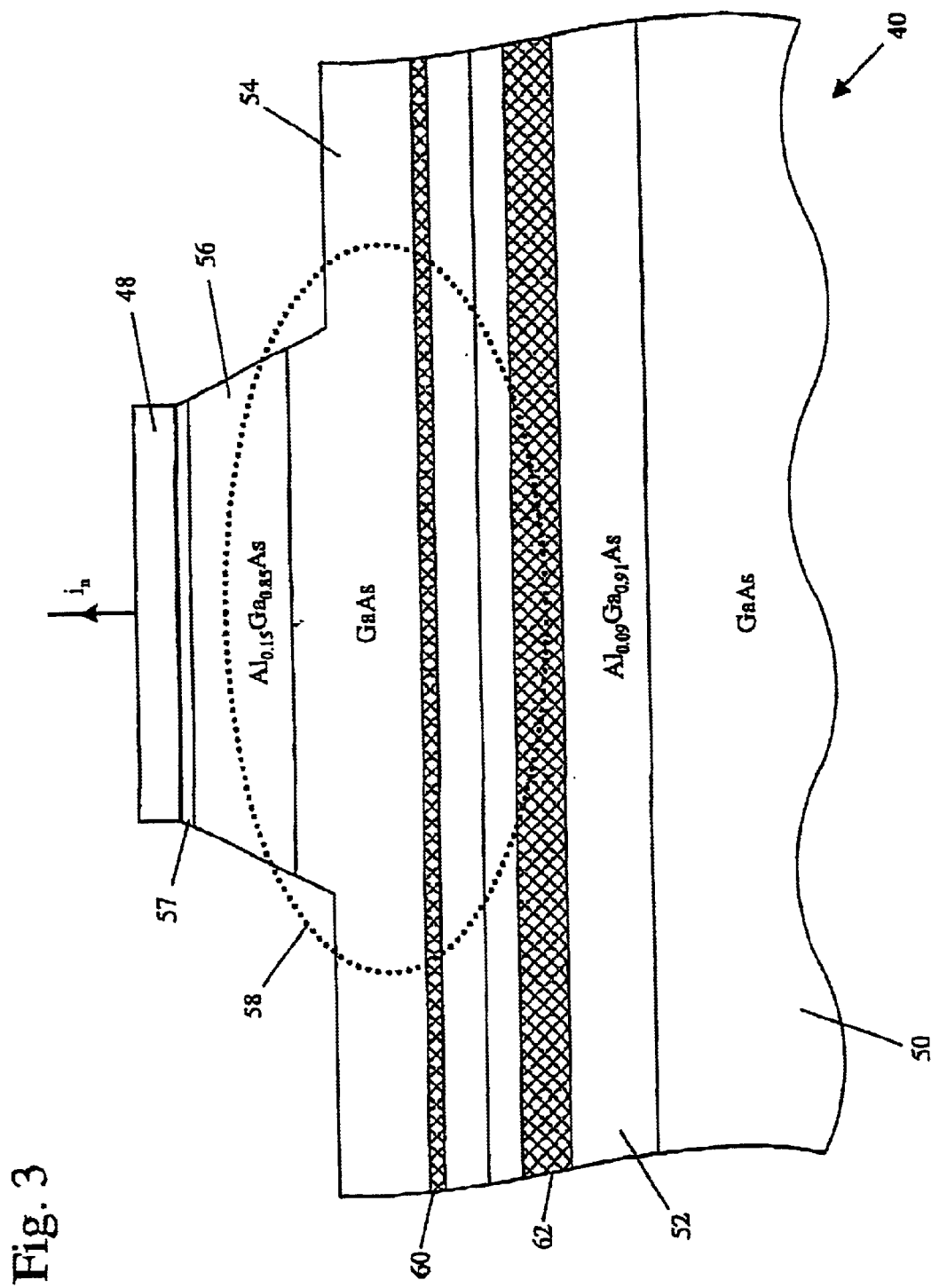
FIG. 3 is a cross-sectional view of the waveguide structure of the optical autocorrelator of FIG. 2 in a direction along the optical axis of the waveguide.

Referring to FIG. 3 there is shown a cross section through the line "AA" of FIG. 2 of the waveguide structure. The waveguide 40 comprises a rib loaded waveguide structure comprising in order, a semi-insulating gallium arsenide (GaAs) substrate 50, a 3.1 μm thick aluminium gallium arsenide (Al$_{0.09}$Ga$_{0.91}$As) layer 52, a 1.95 μm thick GaAs optical guiding layer 54, a further aluminium gallium arsenide (Al$_{0.15}$Ga$_{0.95}$As) layer 56 of 0.85 μm thickness, a 25 nm GaAs thick capping layer 57 and the electrode 48 which typically comprises aluminium on top of a thin titanium bonding layer (Ti:Al). The layer 54 provides the optical waveguide medium with the refractive index contrast between the AlGaAs layers 52 and 56 and layer 54 provides vertical confinement of light thereby constraining light to propagate substantially within the layer 54. Lateral confinement of light is provided by the AlGaAs layer which is selectively etched to define a mesa (plateau region) which provides an in-plane effective refractive index contrast that confines light to propagate in an optical mode below the mesa as illustrated by line 58 in FIG. 3. Typically the mesa is approximately 5 μm in width at its base and has been etched into the GaAs layer 54 such that it has an overall height of 1.2–1.3 μm.

Within the optical guiding layer 54 an n-doped layer 60 is provided to act as a depletion stop layer. A depletion region is formed between the top Schottky contact 48 and the n-doped depletion stop layer 60 such that the waveguide constitutes a photodiode. An n-doped conductive layer 62 is provided within Al$_{0.09}$Ga$_{0.91}$As layer 52 and constitutes a buried backplane electrode to the photodiode. Electrical connection to the conductive layer is facilitated using a large area Schottky contact which is located elsewhere on the structure and is not shown in the Figure. To minimise free-carrier optical loss the n-doped conductive layer 62 is at sufficient distance from the optical guiding layer 54 to minimise strong overlap of the optical mode 58 of the guided pulse with the layer 62. Externally the electrodes 48 and contact are electrically biased such that the large area contact is forward biased thus resulting in a reverse biased waveguide photodiode.

It will be appreciated therefore that the autocorrelator of the present invention thus comprises a plurality of photodiodes which are disposed along the optical axis of the waveguide. In operation the optical input pulse 44 is applied to the input end 42 of the waveguide, propagates along the waveguide and is reflected by the end 46 of the waveguide such as to generate a counter-propagating optical pulse to that of the input pulse. The plurality of electrodes $48_1$–$48_n$ detect, at selected points along the waveguide's length, the photocurrent generated in the waveguide by the counter-propagating pulses. A plot of these currents versus position thus represents an autocorrelation of the input optical pulse.

Since TPA is an ultrafast process such that the absorption is instantaneously dependent on optical intensity, i.e. the probability of a TPA event occurring is proportional to the optical intensity, the total number of TPA events that occur per unit time or unit length of waveguide is therefore proportional to the square of the intensity.

Figure 4:
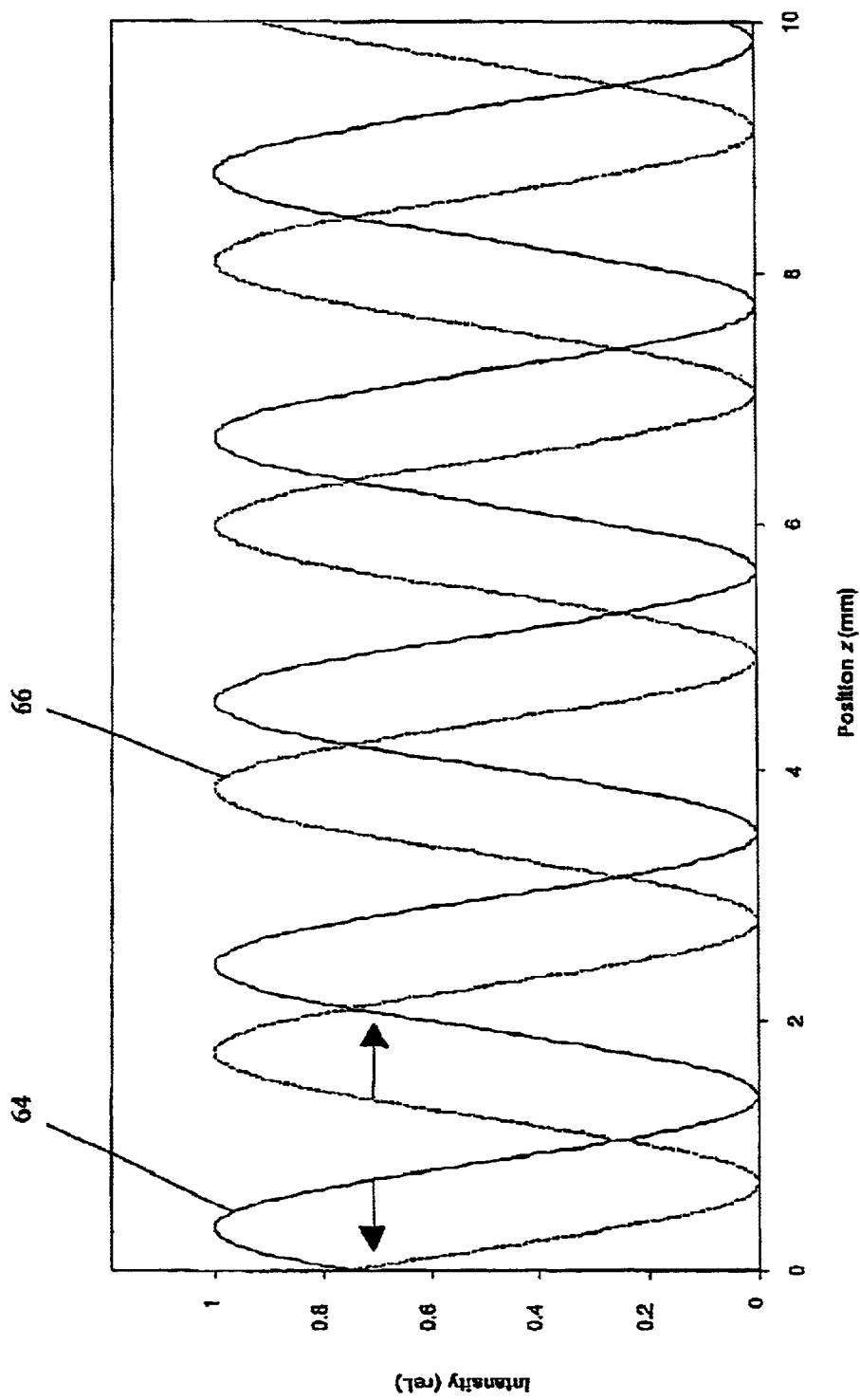
FIG. 4 is a plot of optical intensity versus position along the waveguide.

Referring to FIG. 4 there is shown a plot of optical intensity versus position along the waveguide for a train of raised cosine pulses having a 40 GHz repetition rate. It is to be noted that in this Figure the position designated zero corresponds to the reflecting end 46 of the waveguide. The input optical pulse train is designated 64 and the reflected counter-propagating pulse train indicated as a dashed line 66. It can be shown that the optical amplitudes E$_1$(z) and E$_2$(z) of the input and reflected pulses respectively as a function of distance z along the waveguide is given by:

$$E_1(z) = \hat{E}_1(z)\cos(\omega_0 t - kz) \quad (1)$$

$$E_2(z) = \hat{E}_2(z)\cos(\omega_0 t + kz) \quad (2)$$

where $\hat{E}_1$ and $\hat{E}_2$ are the pulse envelopes of the input and reflected waves, $\omega_0$ is the optical frequency, t is time, k is the waveguide propagation constant, and z is the propagation distance. The optical intensity within the waveguide as a function of distance along the waveguide, I(z), is proportional to $$I(z) \propto |E_1(z) + E_2(z)|^2. \quad (3)$$

As discussed above the total number of TPA events and hence two-photon photocurrent, $i_{tpa}$(z) is proportional to the square of the intensity. Therefore $$i_{tpa}(z) \propto |E_1(z) + E_2(z)|^4. \quad (4)$$

This photocurrent distribution will effectively be an autocorrelation trace of the input pulse where the fast temporal dependence of the input pulses is converted to a spatial dependence (z) which can be time averaged and sampled by the array of Schottky contact photodiodes through the generation of the photocurrents $i_1$ to $i_n$.

The spatial resolution of the autocorrelator is defined by the size of the electrodes 48 (which will typically be tens of $\mu$m) and will, therefore, be much coarser than the optical standing-wave which is typically sub-micron. Thus the photocurrent from each of the electrodes will be a spatial average over many optical wavelengths. The temporal resolution, $t_{res}$, is related to the spatial resolution, $z_{res}$ (the electrode spacing), by the relationship:

$$t_{res} = \frac{n_g}{c} z_{res} \quad (5)$$

where $n_g$ is the group index of the waveguide and c is the speed of light in vacuo.

Figure 5:
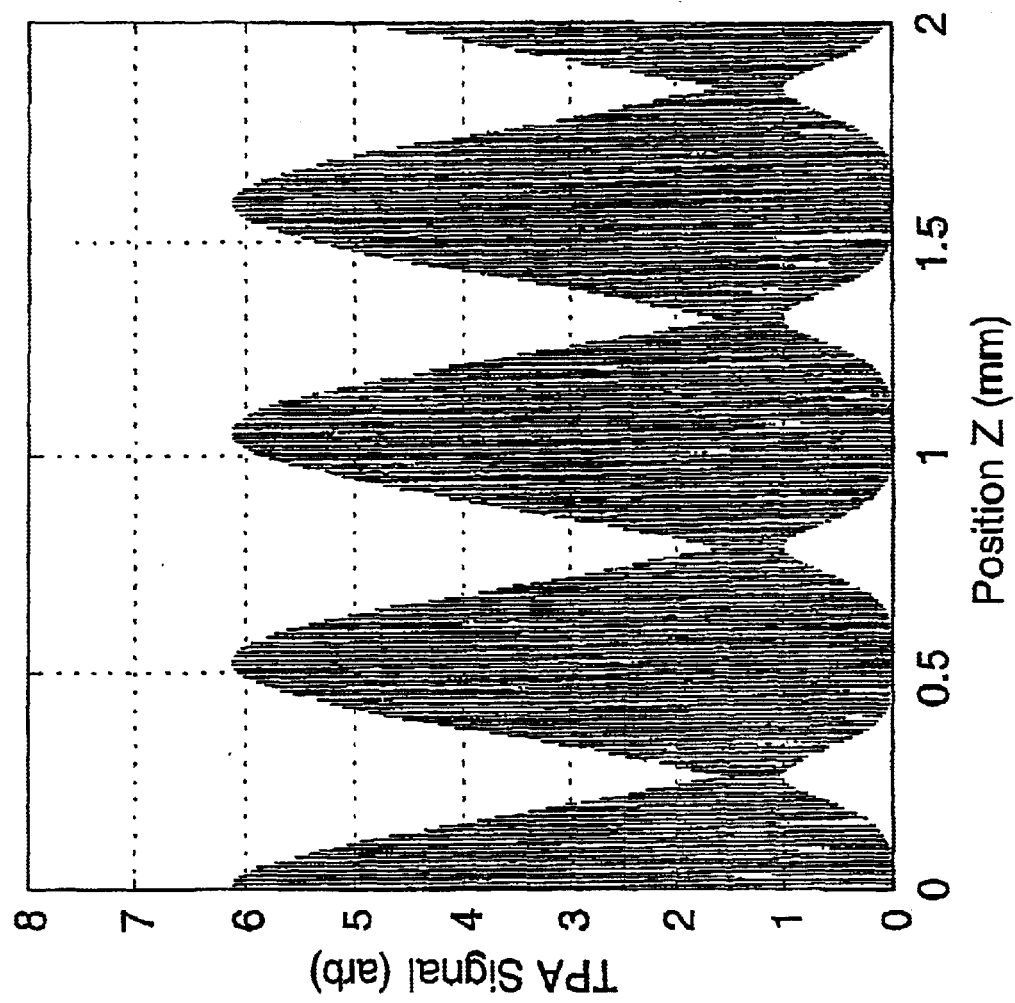
FIG. 5 is a plot of calculated photocurrent versus position along the waveguide.
Figure 6:
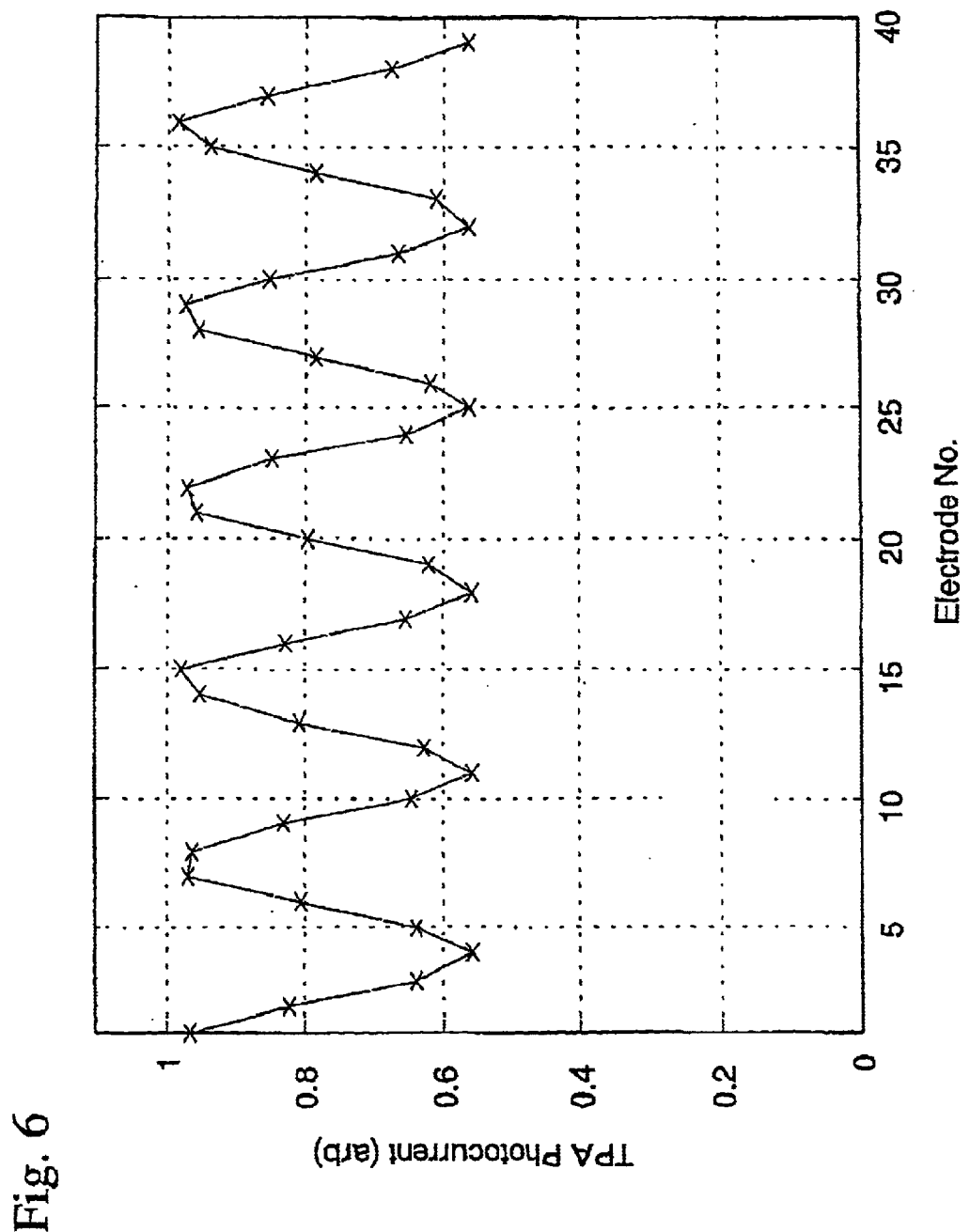
FIG. 6 is a plot of photocurrent versus electrode.

Referring to FIG. 5 there is shown a plot of calculated two-photon photocurrent versus position along the waveguide for a 40 GHz repetition rate pulse train. As can be clearly seen from this Figure the optical standing-wave pattern is on the sub-micron scale. Referring to FIG. 6 this shows the photocurrent distribution versus electrode number for an autocorrelator having forty electrodes which are spaced on a 75 $\mu$m pitch for a 40 GHz repetition rate pulse train. As can be seen from the Figure the fine standing-wave pattern is now lost leaving an autocorrelation trace (with background) with a peak to background contrast ratio of 1.75. For peak optical input powers of ~10 mW two-photon photocurrent levels of 0.1–1.0 $\mu$A are expected at the auto-correlation peaks using 75 $\mu$m pitch electrodes.

A particular advantage of the optical autocorrelator of the present invention is that it can be readily monolithically integrated with other photonic components such as optical modulators, couplers, splitters, two-photon power monitors, etc. In one embodiment it is envisaged to fabricate the autocorrelator with a monolithically integrated optical modulator in front of it. This would allow intensity modulation of the input to the autocorrelator thus facilitating lock-in detection of the autocorrelation trace in order to filter out noise and remove any d.c. signal components due to parasitic leakage currents within the structure. Modulation of the input optical pulse could also be used to determine the relationship between autocorrelation signal and input light level thus permitting extraction of the desired second-order (autocorrelation) signal from any linear signal component that may be present e.g. due to carrier generation via energy levels associated with defects in the semiconductor material.

Although the present invention has been described in detail in relation to the specific embodiment, it will be appreciated that changes, substitutions and variations can be made which are within the scope of the invention. For example whilst, for convenience, the end facet of the waveguide is used to reflect the optical pulse to generate the counter-propagating optical pulse, other reflecting means can be utilised such as etching a facet at a point along the waveguide which is distal to the input facet or by incorporating a reflecting structure within the waveguide such as a Bragg grating defined in the layer 56.

What is claimed is:

1. An optical autocorrelator comprising: an optical waveguide of semiconductor material which exhibits two photon absorption at a wavelength at which the autocorrelator is intended to operate; reflecting means associated with a part of the waveguide which is remote to an end in which an optical pulse is input, said reflecting means for reflecting the optical pulse such as to generate counter-propagating optical pulses in the waveguide and a plurality of electrodes disposed along the waveguide for measuring a two photon absorption photocurrent generated in the waveguide by the counter-propagating optical pulses.

2. An optical autocorrelator according to claim 1 in which the reflecting means comprises an end facet of the waveguide.

3. An optical autocorrelator according to claim 1 in which the reflecting means comprises a grating defined in the waveguide.

4. An optical autocorrelator according to claim 3 in which the grating comprises a Bragg grating.

5. An optical autocorrelator according to claim 1 further comprising an anti-reflection coating on the end of the waveguide into which the optical pulse is input.

6. An optical autocorrelator according claim 1 in which the plurality of electrodes are located at equal intervals along the waveguide.

7. An optical autocorrelator according to claim 1 in which the electrodes form a Schottky contact with the waveguide.

8. An optical autotocorrelator according to claim 1 in which the waveguide comprises GaAlAs/GaAs structure.

9. An optical autocorrelator according to claim 1 further comprising an optical modulator which is monolithically integrated with the autocorrelator for selectively modulating the intensity of the optical pulse before it is input into the waveguide.

* * * * *